United States Patent
Zhou

(10) Patent No.: US 12,113,806 B2
(45) Date of Patent: Oct. 8, 2024

(54) PACKET PROCESSING METHOD, APPARATUS, AND SYSTEM

(71) Applicant: HUAWEI TECHNOLOGIES CO., LTD., GuangDong (CN)

(72) Inventor: Wenfeng Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 17/749,647

(22) Filed: May 20, 2022

(65) Prior Publication Data

US 2022/0286469 A1    Sep. 8, 2022

Related U.S. Application Data

(63) Continuation of application No. PCT/CN2020/118030, filed on Sep. 27, 2020.

(30) Foreign Application Priority Data

Nov. 22, 2019   (CN) .......................... 201911158377.9

(51) Int. Cl.
*H04L 9/40*   (2022.01)
*H04L 12/46*   (2006.01)

(52) U.S. Cl.
CPC ........ *H04L 63/126* (2013.01); *H04L 12/4637* (2013.01); *H04L 12/4641* (2013.01); *H04L 63/0876* (2013.01)

(58) Field of Classification Search
CPC ... H04L 63/12; H04L 63/126; H04L 12/4637; H04L 12/4683
See application file for complete search history.

(56) References Cited

U.S. PATENT DOCUMENTS

| | | | |
|---|---|---|---|
| 2014/0036735 A1 | 2/2014 | Hall et al. | |
| 2015/0381531 A1* | 12/2015 | Huang | H04L 12/4645 370/401 |
| 2018/0212828 A1 | 7/2018 | Sekhri et al. | |

FOREIGN PATENT DOCUMENTS

| CN | 1812300 A | 8/2006 |
|---|---|---|
| CN | 101030912 A | 9/2007 |
| CN | 100466583 C | 3/2009 |
| CN | 104702444 A | 6/2015 |

(Continued)

OTHER PUBLICATIONS 802.1ae—Media Access Control (MAC) Security (Year: 2018).*

(Continued)

*Primary Examiner* — Shirley X Zhang
(74) *Attorney, Agent, or Firm* — Rimon PC

(57) ABSTRACT

This application discloses a packet processing method, apparatus, and system, and belongs to the communications field. In the packet processing method, a first device receives a first packet sent by a second device. The first packet includes identifier information and first authentication information of an Ethernet ring. The first device is an edge device of the Ethernet ring, and the second device is a device outside the Ethernet ring. The first device verifies the validity of the first packet based on the identifier information and the first authentication information. The first device processes the first packet after verifying that the first packet is valid. This method improves the security of Ethernet ring networks.

20 Claims, 6 Drawing Sheets

(56) References Cited

FOREIGN PATENT DOCUMENTS

| | | | | |
|---|---|---|---|---|
| CN | 110048986 A | 7/2019 | | |
| ES | 2596533 B1 * | 10/2017 | ............... | H04L 1/22 |
| IN | 107086959 A | 8/2017 | | |
| WO | 2019123447 A1 | 6/2019 | | |
| WO | 2019137554 A1 | 7/2019 | | |

OTHER PUBLICATIONS

Recommendation ITU-T G.8032/Y.1344, Ethernet Ring Protection Switching (Year: 2015).*
Garrett Leischner et al., "Security Through ULAN Segmentation:Isolating and Securing Critical Assets Without Loss of Usability",SEL 2007,total 7 pages.
ITU-T G.8032/Y.1344(Mar. 2010), Series G: Transmission Systems and Media, Digital Systems and Networks Packet over Transport aspects-Ethernet over Transport aspects, Series Y: Global Information Infrastructure, Internet Protocol Aspects and Next-Generation Networks Internet protocol aspects Transport, 98 pages.

* cited by examiner

PACKET PROCESSING METHOD, APPARATUS, AND SYSTEM

CROSS-REFERENCE TO RELATED APPLICATIONS

This application a continuation of International Application No. PCT/CN2020/118030, filed on Sep. 27, 2020, which claims priority to Chinese Patent Application No. 201911158377.9, filed on Nov. 22, 2019. The disclosures of the aforementioned applications are hereby incorporated by reference in their entireties.

TECHNICAL FIELD

This application relates to the communications field, and in particular, to a packet processing method, apparatus, and system.

BACKGROUND

An Ethernet ring consists of a group of devices that are configured with the same virtual local area network (VLAN), and neighbor devices in the Ethernet ring are connected. For example, refer to FIG. 1. It is assumed that there are devices 1, 2, 3, and 4. Identifier information of the same VLAN is configured on the devices 1, 2, 3, and 4. A connection is established between the device 1 and the device 2, a connection is established between the device 2 and the device 3, a connection is established between the device 3 and the device 4, and a connection is established between the device 4 and the device 1. In this way, the devices 1, 2, 3, and 4 form an Ethernet ring, and the Ethernet ring can be used to transmit packets of the VLAN.

Devices in the same Ethernet ring are in the same Ethernet. There may be two devices in the Ethernet ring that are not connected by a direct path, but the two devices may be connected to a third-party network outside the Ethernet. In this way, the two devices may establish a connection in the third-party network, and the two devices are edge devices of the Ethernet ring. For example, refer to FIG. 2. A device 1 and a device 2 are not connected by a direct path. The device 1 and the device 2 are separately connected to a third-party network, and the device 1 and the device 2 establish a connection in the third-party network. In this way, devices 1, 2, 3, and 4 can also form an Ethernet ring, and the device 1 and the device 2 are edge devices of the Ethernet ring.

However, because the connection between the two edge devices is established in the third-party network, a hacker may forge a packet of the Ethernet ring in the third-party network, send the packet to the Ethernet ring through the connection between the two edge devices, and attack the Ethernet ring by using the packet, which results in low security of the Ethernet ring.

SUMMARY

This application provides a packet processing method, apparatus, and system, to improve the security of an Ethernet ring. Technical solutions are as follows.

According to a first aspect, this application provides a packet processing method. In the method, a first device is an edge device of an Ethernet ring, and a second device is a device outside the Ethernet ring. The first device receives a first packet sent by the second device, where the first packet includes identifier information and first authentication information of the Ethernet ring. The first device verifies the validity of the first packet based on the identifier information and the first authentication information, and processes the first packet after verifying that the first packet is valid.

Because the first packet includes the identifier information and the first authentication information of the Ethernet ring, the first device verifies the validity of the first packet based on the identifier information and the first authentication information. In a case in which the first packet is a packet that is forged by a hacker to attack the Ethernet ring, because the hacker cannot obtain real authentication information corresponding to the Ethernet ring, the first authentication information in the first packet is different from the real authentication information corresponding to the Ethernet ring. It can be verified that the first packet is invalid based on the identifier information and the first authentication information of the Ethernet ring in the first packet. Therefore, the forged packet used to attack the Ethernet ring is effectively verified, and the security of the Ethernet ring is improved.

In a possible implementation, the first device obtains second authentication information of the Ethernet ring based on the identifier information; and verifies the validity of the first packet based on the first authentication information and the second authentication information. Because the second authentication information obtained based on the identifier information is the real authentication information corresponding to the Ethernet ring, the first packet can be accurately verified based on the second authentication information and the first authentication information of the first packet. Not only is the verification of the validity of the first packet based on the identifier information and the first authentication information of the Ethernet ring implemented, but also the accuracy of the verification is improved.

In another possible implementation, the first device obtains ring configuration information of the Ethernet ring from a correspondence between identifier information and ring configuration information based on the identifier information. The first device encrypts the ring configuration information to obtain the second authentication information of the Ethernet ring. Because the ring configuration information is encrypted to obtain the second authentication information of the Ethernet ring, it is ensured that the first authentication information in the first packet is also encrypted. In this case, even when the first packet is intercepted by the hacker, the hacker cannot obtain the ring configuration information of the Ethernet, and cannot obtain the real authentication information corresponding to the Ethernet ring. In this way, the security of the Ethernet ring is improved. Further, the second authentication information of the Ethernet ring is obtained based on the identifier information.

In another possible implementation, the first device removes the first authentication information from the first packet, to obtain a second packet; and sends the second packet to a third device in the Ethernet ring. The third device does not have the verification function and may not identify the first packet including the first authentication information, but may identify the second packet from which the first authentication information is removed. This ensures that the third device can identify and process the second packet when receiving the second packet. This improves the compatibility of the Ethernet ring.

In another possible implementation, the first device obtains a third packet, where the third packet includes the identifier information of the Ethernet ring and the second authentication information of the Ethernet ring; and sends the third packet to a fourth device in the Ethernet ring. Because the third packet includes the identifier information of the Ethernet ring and the second authentication information of the Ethernet ring, it is ensured that the fourth device can perform validity verification on the third packet, to improve the security of the Ethernet ring.

In another possible implementation, the first device receives a fourth packet from a fifth device in the Ethernet ring, where the fourth packet includes the identifier information of the Ethernet ring; obtains the second authentication information of the Ethernet ring based on the identifier information; and adds the second authentication information to the fourth packet to obtain the third packet. Because the second authentication information obtained based on the identifier information is the real authentication information corresponding to the Ethernet ring, it is ensured that the third packet includes the real authentication information corresponding to the Ethernet and the verification of third packet performed by the fourth device that receives the third packet succeeds.

In another possible implementation, the ring configuration information of the Ethernet ring includes at least one of the following: key information, a ring identifier of the Ethernet ring, a network identifier of a virtual local area network VLAN corresponding to the Ethernet ring, a device identifier of a device included in the Ethernet ring, a maintenance association end point MEP value of the Ethernet ring, and protocol version information corresponding to the Ethernet ring. Because configuration parameters such as key information, VLAN network identifiers, ring identifiers, and MEP values corresponding to different Ethernet rings are different, that is, ring configuration information of different Ethernet rings is different, it is ensured that real authentication information corresponding to different Ethernet rings are different. Therefore, it is ensured that the verification of authentication information that is obtained based on the ring configuration information succeeds only for a packet that belongs to the Ethernet ring. This improves the verification accuracy.

In another possible implementation, the first packet is an Ethernet ring protection switching (ERPS) protocol packet. Because the first packet is the ERPS protocol packet, to be specific, the first device performs validity verification on the ERPS protocol packet, the possibility that a hacker attacks the Ethernet by using the ERPS protocol packet is eliminated, and the security of the Ethernet ring is improved.

According to a second aspect, this application provides a packet processing apparatus, configured to perform the method according to any one of the first aspect or the possible implementations of the first aspect. Specifically, the apparatus includes units configured to perform the method according to any one of the first aspect or the possible implementations of the first aspect.

According to a third aspect, an embodiment of this application provides a packet processing apparatus, where the apparatus includes: a processor, a memory, and a communications interface. The processor, the memory, and the communications interface may be connected by a bus system. The memory is configured to store one or more programs, and the processor is configured to execute the one or more programs in the memory, to complete the method in any one of the first aspect or the possible implementations of the first aspect.

According to a fourth aspect, this application provides a computer-readable storage medium. The computer-readable storage medium stores a program. When the program is run on a computer, the computer is enabled to perform the method according to any one of the first aspect or the possible implementations of the first aspect.

According to a fifth aspect, this application provides a computer program product including a program. When the computer program product is run on a computer, the computer is enabled to perform the method according to any one of the first aspect or the possible implementations of the first aspect.

According to a sixth aspect, this application provides a packet processing system. The system includes: a first device and a second device, where the first device is an edge device of an Ethernet ring, and the second device is a device outside the Ethernet ring. The second device is configured to send a first packet to the first device, where the first packet includes identifier information and first authentication information of the Ethernet ring. The first device is configured to receive the first packet, verify validity of the first packet based on the identifier information and the first authentication information, and process the first packet after verifying that the first packet is valid. Because the first packet includes the identifier information and the first authentication information of the Ethernet ring, the first device verifies the validity of the first packet based on the identifier information and the first authentication information, to effectively verify a forged packet used to attack the Ethernet ring. The first device processes the first packet after verifying that the packet is valid. This improves the security of the Ethernet ring.

DESCRIPTION OF EMBODIMENTS

The following further describes in detail embodiments of this application with reference to accompanying drawings.

An Ethernet is a computer local area network technology. Ethernet has various topology structures, one of which is a ring topology. For an Ethernet of a ring structure, a connection may be established between any two neighbor devices in the Ethernet, to form an Ethernet ring. An Ethernet ring is a logical network. An Ethernet ring corresponds to a VLAN and can be used to transmit packets of the VLAN.

Optionally, the foregoing device is a device configured to transmit packets, for example, a router, a switch, or access to transmission network (ATN).

Figure 1:
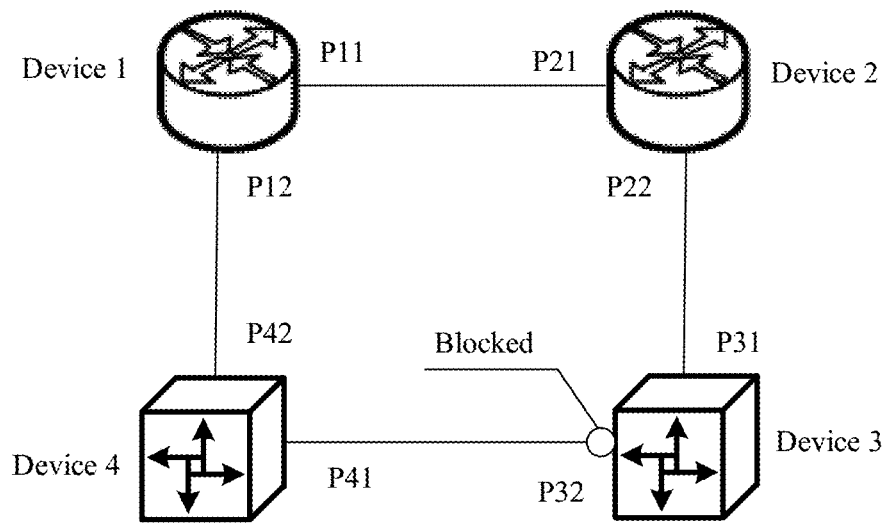
FIG. 1 is a schematic diagram of a structure of a closed Ethernet ring according to an embodiment of this application.

Refer to an Ethernet of a ring structure shown in FIG. 1. The Ethernet includes devices 1, 2, 3, and 4. In the Ethernet, two neighbor devices are connected by a physical path. In this way, a connection is established on a physical path between the device 1 and the device 2, where the connection is used to connect a first port P11 on the device 1 and a first port P21 on the device 2. A connection is established on a physical path between the device 2 and the device 3, where the connection is used to connect a second port P22 on the device 2 and a first port P31 on the device 3. A connection is established on a physical path between the device 3 and the device 4, where the connection is used to connect a second port P32 on the device 3 and a first port P41 on the device 4. A connection is established on a physical path between the device 4 and the device 1, where the connection is used to connect a second port P42 on the device 4 and a second port P12 on the device 1. In this way, an Ethernet ring can be formed.

The same VLAN is configured on the first port P11 and the second port P12 of the device 1, the first port P21 and the second port P22 of the device 2, the first port P31 and the second port P32 of the device 3, and the first port P41 and the second port P42 of the device 4. In this way, the Ethernet ring can be used to transmit packets of the VLAN.

To prevent a broadcast storm in the Ethernet ring caused by a loop formed by the Ethernet ring, currently, a port on a device in the Ethernet ring may be blocked. The blocked port is referred to as a ring protection link owner (RPL owner) port of the Ethernet ring.

For any device in the Ethernet ring, when the device needs to send a packet to another device in the Ethernet ring, the device sends a packet to the other device through a first port of the device, and sends a packet to the other device through a second port of the device. That is, the device sends two packets to the other device. However, because a port in the Ethernet ring is blocked, only one packet can be transmitted to the other device, and the transmission of the other packet is interrupted by the port. For example, for the Ethernet ring shown in FIG. 1, the second port P32 of the device 3 may be blocked. In this way, for any device that needs to send a packet in the Ethernet ring, it is assumed that the device 4 needs to send a packet to the device 2, the device 4 sends a packet to the device 2 through the first port 41, and sends a packet to the device 2 through the second port P42. Because the second port P32 of the device 3 is blocked, the packet sent from the first port P41 is blocked by the device 3, and the packet sent from the second port P42 is transmitted to the device 3. Therefore, formation of a loop is avoided.

For some Ethernets, there may be two devices in the Ethernet that are not connected by a physical path, but the two devices are connected to a third-party network outside the Ethernet. In this way, the two devices may establish a connection in the third-party network, and devices in the Ethernet may also form an Ethernet ring. The two devices are edge devices in the Ethernet ring. The third-party network can be a wide area network, a physical local area network, or another Ethernet ring.

Figure 2:
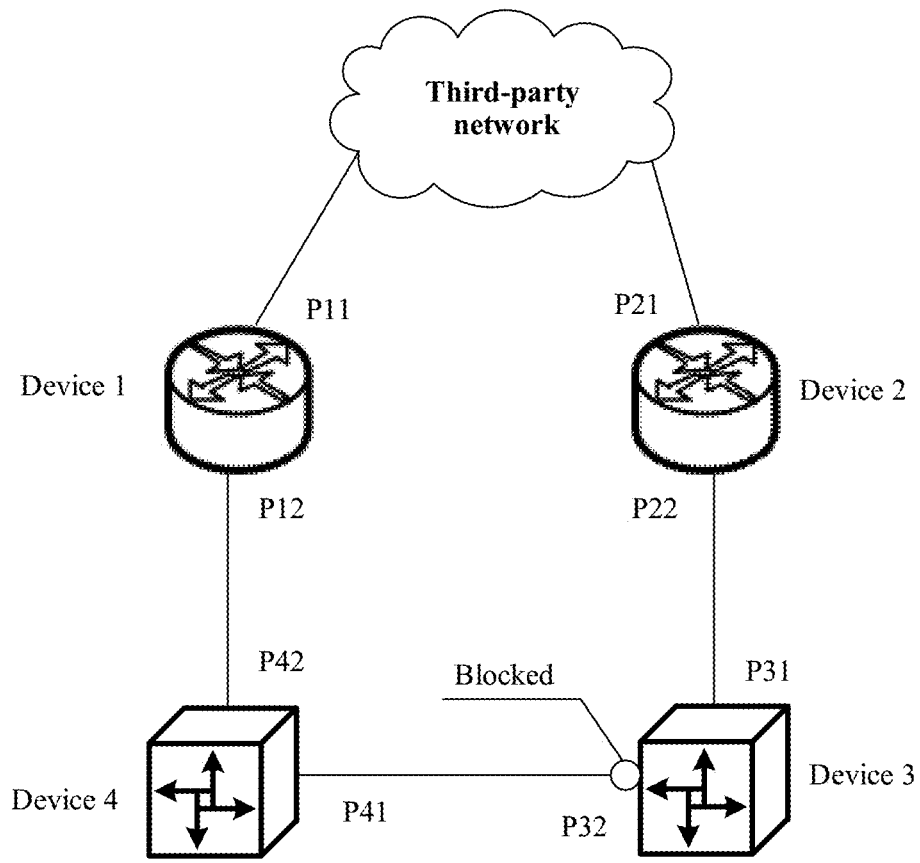
FIG. 2 is a schematic diagram of a structure of a non-closed Ethernet ring according to an embodiment of this application.

For example, refer to an Ethernet shown in FIG. 2. The Ethernet shown in FIG. 2 is compared with the Ethernet shown in FIG. 1. A device 1 and a device 2 included in the Ethernet shown in FIG. 2 are not directly connected by a physical path, but both the device 1 and the device 2 are connected to a third-party network. In this way, in the third-party network, a connection may be established between the device 1 and the device 2. The connection connects a first port P11 of the device 1 and a first port P21 of the device 2. In this way, the device 1, the device 2, a device 3, and a device 4 can also form an Ethernet ring. The device 1 and the device 2 are edge devices of the Ethernet ring.

When the third-party network is another Ethernet ring, an edge device of the Ethernet ring is connected to the other Ethernet ring, and a connection is established to the other Ethernet ring. In this case, the Ethernet ring intersects the other Ethernet ring.

The Ethernet ring shown in FIG. 1 is a closed ring. Any two neighbor devices in the Ethernet ring are connected by a physical path, and the entire Ethernet ring is in the Ethernet. The Ethernet ring shown in FIG. 2 is a non-closed ring. A part of the Ethernet ring is in the Ethernet, and another part is in the third-party network. In this case, a hacker may forge a packet of the Ethernet ring in the third-party network, send the packet to the Ethernet ring through the connection between the two edge devices, and attack the Ethernet ring by using the packet. To protect the Ethernet ring, when receiving a packet from the third-party network, a device in the Ethernet ring verifies the validity of the packet. For a detailed implementation process, refer to a subsequent embodiment shown in FIG. 3 or FIG. 6. Details are not described herein.

In addition, a plurality of Ethernet rings may be formed in one Ethernet, and different Ethernet rings correspond to different VLANs. That is, for any two neighbor devices in the Ethernet, a connection corresponding to each Ethernet ring is established between the two devices. For either of the two devices, the device includes a port corresponding to each Ethernet ring. The port corresponding to each Ethernet ring is connected to the connection corresponding to each Ethernet ring. A VLAN corresponding to each Ethernet ring is configured on the port corresponding to each Ethernet ring.

A technician may configure the VLAN corresponding to the Ethernet ring on the port of the device. Sometimes, the technician may configure a VLAN corresponding to another Ethernet ring on a port corresponding to an Ethernet ring of the device. In this case, when the device sends a packet in the Ethernet ring, the packet includes a network identifier of the VLAN corresponding to the other Ethernet ring. For other devices in the Ethernet ring, when receiving the packet from the Ethernet ring, the other devices detect that the network identifier of the VLAN in the packet is not a network identifier of the VLAN corresponding to the Ethernet ring, and broadcast the packet in the Ethernet ring. This may cause a broadcast storm in the Ethernet ring. In this case, the embodiment subsequently shown in FIG. 6 may also be implemented to avoid the broadcast storm in the Ethernet ring.

Figure 3:
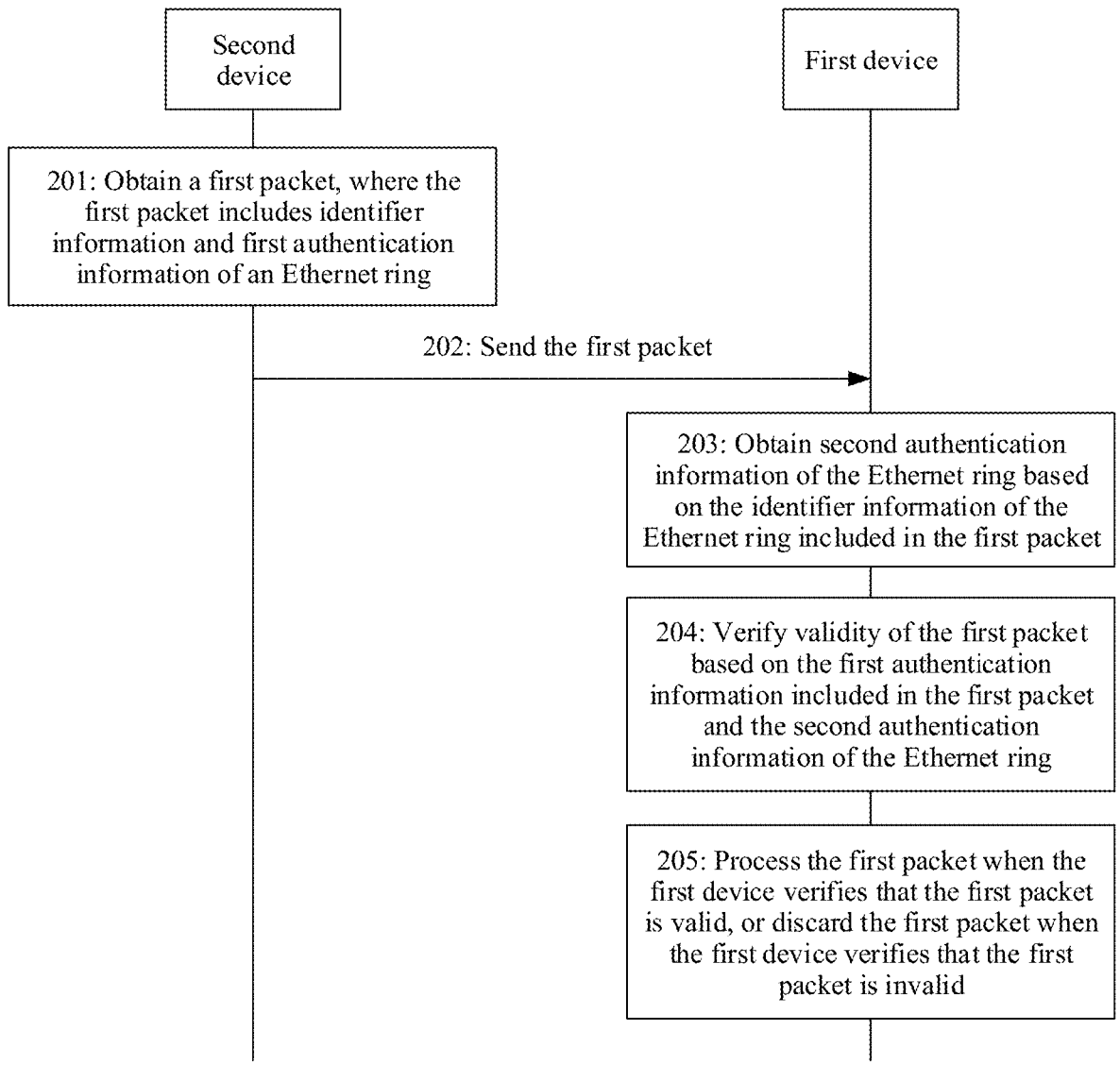
FIG. 3 is a flowchart of a packet processing method according to an embodiment of this application.
Figures 5, 6:
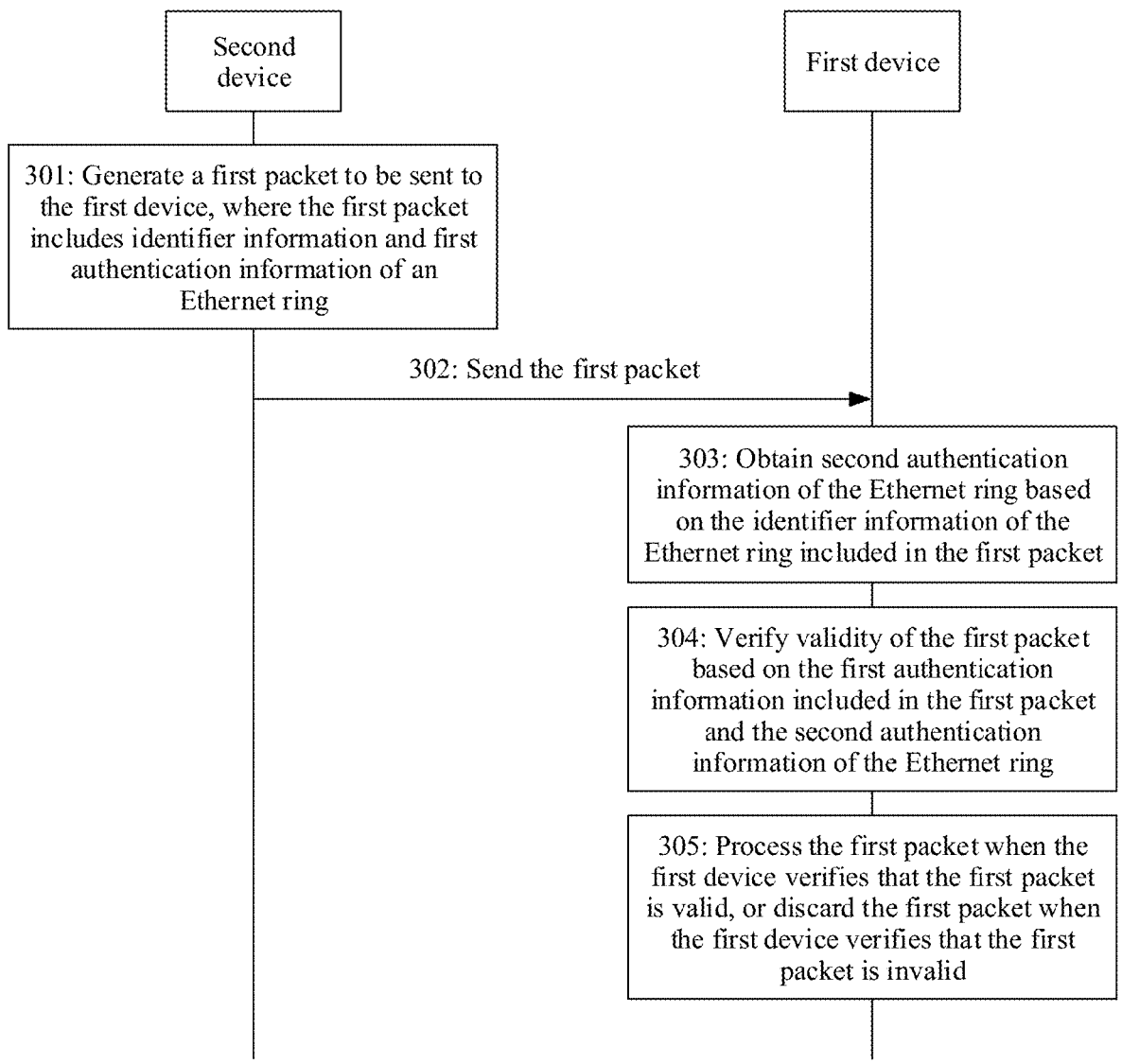
FIG. 5 is a schematic diagram of a structure of a type length value field according to an embodiment of this application.
FIG. 6 is a flowchart of another packet processing method according to an embodiment of this application.

Before the embodiment subsequently shown in FIG. 3 or FIG. 6 is implemented, a correspondence between identifier information and ring configuration information needs to be stored in an edge device of the Ethernet ring, or the correspondence between identifier information and ring configuration information is stored in each device of the Ethernet ring. Any record in the correspondence stores identifier information of an Ethernet ring and ring configuration information of the Ethernet ring.

When the Ethernet ring is formed, for any edge device of the Ethernet ring, the any edge device obtains the identifier information and the ring configuration information of the Ethernet ring, and correspondingly stores the identifier information and the ring configuration information of the Ethernet ring in the correspondence between identifier information and ring configuration information. Alternatively, for any device in the Ethernet, the any device obtains the identifier information and the ring configuration information of the Ethernet ring, and correspondingly stores the identifier information and the ring configuration information of the Ethernet ring in the correspondence between identifier information and ring configuration information.

Optionally, the technician may configure the ring configuration information of the Ethernet ring on the either edge device or the any device, so that the either edge device or the any device obtains the ring configuration information configured by the technician.

Optionally, the identifier information of the Ethernet ring includes at least one of a ring identifier of the Ethernet ring, the network identifier of the VLAN corresponding to the Ethernet ring, and the like. To be specific, the identifier information of the Ethernet ring may be the ring identifier of the Ethernet ring, or the network identifier of the VLAN corresponding to the Ethernet ring, or the identifier information of the Ethernet ring may include the ring identifier of the Ethernet ring and the network identifier of the VLAN corresponding to the Ethernet ring.

A length of the ring identifier of the Ethernet ring may be one or more bytes, for example, may be one byte. A length of the network identifier of the VLAN may be a plurality of bytes, for example, may be two bytes.

The ring configuration information of the Ethernet ring includes at least one of key information, the ring identifier of the Ethernet ring, the network identifier of the VLAN corresponding to the Ethernet ring, and a maintenance association end point (MEP) value of the Ethernet ring, protocol version information corresponding to the Ethernet ring, device identifiers of devices included in the Ethernet ring, ring configuration information of the other Ethernet ring intersecting the Ethernet ring, and the like.

Optionally, when the identifier information of the Ethernet ring includes the ring identifier of the Ethernet ring, the ring configuration information corresponding to the identifier information may not include the ring identifier of the Ethernet ring. When the identifier information of the Ethernet ring includes the network identifier of the VLAN corresponding to the Ethernet ring, the ring configuration information corresponding to the identifier information may not include the network identifier of the VLAN corresponding to the Ethernet ring.

Optionally, there are two VLANs corresponding to the Ethernet ring. One VLAN is referred to as a control VLAN. The control VLAN is a VLAN used by a control plane packet in the Ethernet ring, and a packet header of the control plane packet includes a network identifier of the control VLAN. The other VLAN is referred to as a protected VLAN. The protected VLAN is a VLAN used by a data plane packet in the Ethernet ring, and a packet header of the data plane packet includes a network identifier of the protected VLAN. The network identifier of the VLAN includes the network identifier of the control VLAN or the network identifier of the protected VLAN.

The key information may be preset information, and length of the key information may be one or more bytes. For example, the length of the key information may be greater than or equal to 1 byte and less than or equal to 127 bytes. For example, the length of the key information may be 20, 30, or 50 bytes. In addition, key information preset for different Ethernet rings may be different. A length of the network identifier of the control VLAN may be a plurality of bytes, for example, may be two bytes. A length of the network identifier of the protected VLAN may be a plurality of bytes, for example, may be two bytes.

An embodiment of this application provides a packet processing method. The method can be applied to the non-closed Ethernet ring shown in FIG. 2. In the method, a first device receives a packet in a third-party network, and verifies the validity of the packet. The packet may be sent by a second device. The first device is an edge device of the Ethernet ring, and the second device is another edge device of the Ethernet ring. Refer to FIG. 3. The method includes the following steps.

Step 201: The second device obtains a first packet. The first packet includes identifier information and first authentication information of the Ethernet ring, and the second device is another edge device in the Ethernet ring other than the first device.

The second device includes a first port and a second port. The second device is connected to the third-party network through the first port, and is connected to another device in the Ethernet ring through the second port. For example, it is assumed that the second device is a device 2 in the Ethernet ring shown in FIG. 2. The device 2 includes a first port P21 and a second port P22. The device 2 is connected to the third-party network through the first port P21, and is connected to a device 3 in the Ethernet ring through the second port P22.

Optionally, the first packet may be a control plane packet or a data plane packet of the Ethernet ring. The control plane packet may be an Ethernet ring protection switching (ERPS) protocol packet or the like.

The second device obtains the first packet in the following two cases.

In a first case, when the second device needs to send a packet to a device in the Ethernet ring, the second device may obtain the identifier information and the first authentication information of the Ethernet ring, and generate the first packet including the identifier information and the first authentication information of the Ethernet ring.

In the first case, the second device may obtain the identifier information of the Ethernet ring; obtain ring configuration information of the Ethernet ring from a correspondence between identifier information and ring configuration information based on the identifier information of the Ethernet ring; encrypt the ring configuration information by using an encryption algorithm to obtain the first authentication information of the Ethernet ring; and generate the first packet including the identifier information and the first authentication information of the Ethernet ring.

For example, refer to FIG. 2. It is assumed that the device 2 needs to send a packet to a device 4. The device 2 obtains the ring configuration information of the Ethernet ring from the correspondence between identifier information and ring configuration information based on the identifier information of the Ethernet ring; encrypts the ring configuration information by using the encryption algorithm to obtain the first authentication information of the Ethernet ring; and generates the first packet including the identifier information and the first authentication information of the Ethernet ring.

In a second case, the second device receives a second packet from an Ethernet corresponding to the Ethernet ring, where the second packet includes the identifier information of the Ethernet ring; obtains the first authentication information of the Ethernet ring based on the identifier information of the Ethernet ring; and generates the first packet including the identifier information and the first authentication information of the Ethernet ring.

In the second case, the second packet may be sent by another device in the Ethernet ring other than the second device, and the second device may receive the second packet through a second port. The second device may obtain the identifier information of the Ethernet ring from the second packet; obtain the ring configuration information of the Ethernet ring from the correspondence between identifier information and ring configuration information based on the identifier information of the Ethernet ring; encrypt the ring configuration information by using the encryption algorithm to obtain the first authentication information of the Ethernet ring; and generate the first packet including the identifier information and the first authentication information of the Ethernet ring.

Optionally, the second packet may include a VLAN tag field, and the VLAN TAG field includes a network identifier of a VLAN corresponding to the Ethernet ring. After receiving the second packet, the second device obtains, from the VLAN TAG field of the second packet, the network identifier of the VLAN corresponding to the Ethernet ring as the identifier information of the Ethernet ring.

Optionally, the foregoing encryption algorithm may be a message-digest algorithm 5 (MD5), message authentication code (HMAC) 196, HMAC 256, or the like.

For example, refer to FIG. 2. It is assumed that the device 3 needs to send the second packet including the identifier information of the Ethernet ring to the device 4. The device 3 sends the second packet through a first port P31, and sends the second packet through a second port P32. Because the second port P32 is blocked, the second packet cannot be successfully sent from the second port P32. However, the second packet sent from the first port P31 is transmitted to the device 2, and the device 2 receives the second packet through the second port P22. Then the device 2 obtains the ring configuration information of the Ethernet ring from the correspondence between identifier information and ring configuration information based on the identifier information of the Ethernet ring included in the second packet; encrypts the ring configuration information by using the encryption algorithm to obtain the first authentication information of the Ethernet ring; and generates the first packet including the identifier information and the first authentication information of the Ethernet ring.

Optionally, the encryption performed by the second device on the ring configuration information by using the encryption algorithm may be:

The second device may select at least one configuration parameter from the ring configuration information to form digest information, and encrypt the digest information by using the encryption algorithm to obtain the first authentication information of the Ethernet ring.

Optionally, the digest information formed by the second device may include two types. A first type of the digest information includes a ring identifier of the Ethernet ring, a network identifier of a control VLAN, and key information.

Optionally, the second device may further obtain a device identifier of a source device of the first packet, and add the device identifier of the source device to the first type of digest information to obtain a second type of the digest information. That is, the device identifier, the ring identifier of the Ethernet ring, the network identifier of the control VLAN, and the key information form the second type of the digest information. The second type of the digest information includes more information than the first type of the digest information, which further improves the security of the Ethernet ring.

Optionally, the device identifier may be a media access control (MAC) address, an Internet protocol (IP) address, or the like.

In the foregoing first case, the source device of the first packet is the second device, and the device identifier that is of the source device of the first packet and that is obtained by the second device is a device identifier of the second device. In the foregoing second case, the second packet includes the device identifier of the source device, and the second device may extract the device identifier of the source device from the second packet.

The second device may further select at least one of a network identifier of a protected VLAN of the Ethernet ring, an MEP value of the Ethernet ring, protocol version information corresponding to the Ethernet ring, and the like. The second type of the digest information may further include at least one of the network identifier of the protected VLAN of the Ethernet ring, the MEP value of the Ethernet ring, the protocol version information corresponding to the Ethernet ring, and the like.

Figure 4:
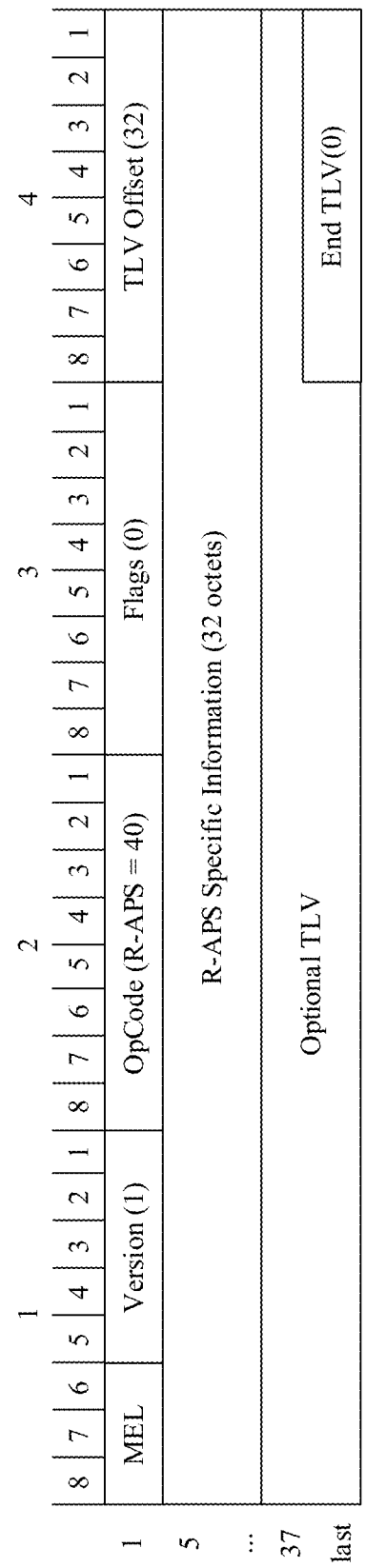
FIG. 4 is a schematic diagram of a structure of a first packet according to an embodiment of this application.

Optionally, refer to a structure of the first packet shown in FIG. 4. The first packet includes a maintenance entity group level (MEL) field, a version (Version) field, an operate code (OpCode) field, a flag field, a type length value (TLVOffset) field, a ring auto protection switching specific information (R-APS specific information) field, an optional TLV field, and an end TLV field.

Optionally, the end TLV field may include the first authentication information of the Ethernet ring.

Optionally, refer to an end TLV field shown in FIG. 5. The end TLV field includes a Type field, a Length field, and a Value field. The Type field may include an authentication indication. The Length field includes a length of the Value field. The Value field includes the first authentication information of the Ethernet ring. The authentication indication is used to indicate that content included in the Value field is first authentication information.

Optionally, the authentication indication may be a value such as 0xFFF0 or 0xFFF1.

Step 202: The second device sends the first packet to the third-party network.

The second device sends the first packet to the third-party network through the first port.

A connection is established between the first port of the second device and a first port of another edge device in the Ethernet ring. For ease of description, the other edge device is referred to as the first device, that is, the connection is established between the first port of the second device and the first port of the first device in the third-party network. After the second device sends the first packet to the third-party network through the first port, the first packet is transmitted to the first port of the first device through the connection.

In the foregoing first case, in addition to sending the first packet to the third-party network through the first port, the second device may further send the first packet to the Ethernet through the second port. The first packet that is sent to the Ethernet may not include the first authentication information of the Ethernet ring.

For example, refer to FIG. 2. A connection is established in the third-party network between the first port P21 of the device 2 and a first port P11 of a device 1. The device 2 sends the first packet to the third-party network through the first port P21, and the first packet is transmitted to the first port P11 of the device 1 through the connection. If the first packet is a packet generated by the device 2, that is, in the foregoing first case, the device 2 further sends the first packet to the Ethernet through the second port P22. In this case, the device 3 in the Ethernet receives the first packet. Because the second port P32 of the device 3 is blocked, the device 3 stops forwarding the first packet.

Step 203: The first device receives the first packet from the third-party network, and obtains second authentication information of the Ethernet ring based on the identifier information of the Ethernet ring included in the first packet.

The first device includes the first port and a second port. The first device is connected to the third-party network through the first port, and is connected to another device in the Ethernet ring through the second port. For example, it is assumed that the first device is the device 1 in the Ethernet ring shown in FIG. 2. The device 1 includes the first port P11 and the second port P12. The device 1 is connected to the third-party network through the first port P11, and is connected to the device 4 in the Ethernet ring through the second port P12.

The first device may receive the first packet through the first port; obtain the identifier information of the Ethernet ring from the first packet; obtain the ring configuration information of the Ethernet ring from the correspondence between identifier information and ring configuration information based on the identifier information of the Ethernet ring; and encrypt the ring configuration information by using the encryption algorithm to obtain the second authentication information of the Ethernet ring.

Optionally, the first device may select at least one configuration parameter from the ring configuration information to form digest information, and encrypt the digest information by using the encryption algorithm to obtain the second authentication information of the Ethernet ring.

Optionally, the first device and the second device may agree in advance to select, from the ring configuration information of the Ethernet ring, the configuration parameter that constitutes the digest information. Therefore, in this step, the configuration parameter selected by the first device from the ring configuration information of the Ethernet ring is the same as the configuration parameter selected by the second device from the ring configuration information of the Ethernet ring. In this way, it is ensured that the digest information formed by the first device is the same as the digest information formed by the second device. It is also ensured that the second authentication information obtained through encrypting, by the first device, the digest information formed by the first device is the same as the first authentication information obtained through encrypting, by the second device, the digest information formed by the second device.

Step 204: The first device verifies the validity of the first packet based on the first authentication information included in the first packet and the second authentication information of the Ethernet ring.

The first device may obtain the first authentication information from the first packet, and compare the first authentication information with the second authentication information. If the first authentication information and the second authentication information are the same, the first device verifies that the first packet is valid. If the first authentication information and the second authentication information are different, the first device verifies that the first packet is invalid.

When the first device verifies that the first packet is invalid, the first device directly discards the first packet. When the first device verifies that the first packet is valid, the first device performs the following operation in Step 205.

Optionally, refer to FIG. 5. The first packet includes the end TLV field, and reads content included in the Type field that is in the end TLV field. If the read content is the authentication indication, the first device determines, based on the authentication indication, that the content included in the Value field that is in the end TLV field is the first authentication information, and reads the first authentication information from the Value field.

Step 205: The first device processes the first packet when the first device verifies that the first packet is valid, or discards the first packet when the first device verifies that the first packet is invalid.

When a destination device of the first packet is the first device, the first device removes the first authentication information from the first packet to obtain the second packet, and a processor of the first device processes the second packet. When the destination device of the first packet is not the first device, the first device removes the first authentication information from the first packet to obtain the second packet, and the first device sends the second packet to the Ethernet through the second port.

The first packet includes a device identifier of the destination device. The first device obtains the device identifier of the destination device from the first packet, and determines whether the destination device is the first device based on the device identifier of the destination device.

For example, it is assumed that the device 1 determines that the first packet is valid. Because the first packet is the packet sent by the device 2 to the device 4 and the device identifier of the destination device included in the first packet is a device identifier of the device 4, the device 1 removes the first authentication information from the first packet to obtain the second packet, and sends the second packet to the device 4 through the second port P21.

Optionally, the first device may also receive a packet sent by a device outside the Ethernet ring. The packet may be a packet forged by the device outside the Ethernet ring. Because the device cannot obtain real authentication information of the Ethernet ring, when the first device verifies the packet based on the identifier information and the authentication information of the Ethernet ring in the packet, the first device definitely verifies that the packet is invalid, and discards the packet. This prevents the packet from attacking the Ethernet ring.

In some embodiments of this application, the second device is the edge device in the Ethernet ring. When sending the first packet to the third-party network, the second device adds the first authentication information of the Ethernet ring to the first packet. The first device is another edge device in the Ethernet ring. The first device receives the first packet from the third-party network, and obtains the second authentication information of the Ethernet ring based on the identifier information of the Ethernet ring included in the first packet. The first device verifies the validity of the first packet based on the second authentication information of the Ethernet ring and the first authentication information included in the first packet. When the first device verifies that the first packet is valid, the first device processes the first packet. This can effectively prevent a hacker from attacking the Ethernet ring through the third-party network, thereby improving the security of the Ethernet ring. When the first device is not the destination device of the first packet, the first device removes the first authentication information from the first packet to obtain the second packet, and sends the second packet to the Ethernet. In this way, when another device that does not support an authentication function in the Ethernet ring receives the second packet, the second packet can be processed, which ensures the compatibility with devices that do not support authentication.

An embodiment of this application provides a packet processing method. The method can be applied to a closed Ethernet ring shown in FIG. 1 or a non-closed Ethernet ring shown in FIG. 2. In the method, a first device receives a packet sent to the first device, and verifies the validity of the packet. The packet may be a packet sent by a second device. The first device is any device of the Ethernet ring, and the second device is another device of the Ethernet ring. Refer to FIG. 6. The method includes the following steps.

Step 301: The second device generates the first packet to be sent to the first device. The first packet includes identifier information and first authentication information of the Ethernet ring, and the second device is any device in the Ethernet ring other than the first device.

Optionally, the first packet may be an Ethernet ring protection switching ERPS protocol packet or the like.

Optionally, when the second device needs to send a packet to the first device, the second device may obtain the identifier information and the first authentication information of the Ethernet ring, and generate the first packet including the identifier information and the first authentication information of the Ethernet ring.

Optionally, the second device may obtain the identifier information of the Ethernet ring; obtain ring configuration information of the Ethernet ring from a correspondence between identifier information and ring configuration information based on the identifier information of the Ethernet ring; encrypt the ring configuration information by using an encryption algorithm to obtain the first authentication information of the Ethernet ring; and generate the first packet including the identifier information and the first authentication information of the Ethernet ring.

For example, refer to FIG. 2. It is assumed that the device 2 needs to send a packet to a device 4. The device 2 obtains the ring configuration information of the Ethernet ring from the correspondence between identifier information and ring configuration information based on the identifier information of the Ethernet ring; encrypts the ring configuration information by using the encryption algorithm to obtain the first authentication information of the Ethernet ring; and generates the first packet including the identifier information and the first authentication information of the Ethernet ring.

Optionally, the encryption performed by the second device on the ring configuration information by using the encryption algorithm may be:

The second device may select at least one configuration parameter from the ring configuration information to form digest information, and encrypt the digest information by using the encryption algorithm to obtain the first authentication information of the Ethernet ring.

An implementation in which the first device forms digest information is the same as an implementation in which the second device forms the digest information in the embodiment shown in FIG. 3. Details are not described herein again.

Optionally, when the identifier information corresponding to the Ethernet ring is a network identifier of a VLAN corresponding to the Ethernet ring, if a technician configures the VLAN corresponding to the Ethernet ring as a VLAN of another Ethernet ring in the second device, ring configuration information that is corresponding to the network identifier of the VLAN and that is stored in the second device is the ring configuration information corresponding to the Ethernet ring. Ring configuration information that is corresponding to the network identifier of the VLAN and that is stored in another device of the Ethernet ring is ring configuration information of the other Ethernet ring.

Optionally, the first packet generated by the second device includes an end TLV field, and the end TLV field may include the first authentication information of the Ethernet ring.

Optionally, refer to an end TLV field shown in FIG. 5. The end TLV field includes a Type field, a Length field, and a Value field. The Type field may include an authentication indication. The Length field includes a length of the Value field. The Value field includes the first authentication information of the Ethernet ring. The authentication indication is used to indicate that content included in the Value field is first authentication information.

Optionally, the authentication indication may be a value such as 0xFFF0 or 0xFFF1.

Step 302: The second device sends the first packet to the first device.

In the Ethernet ring, a first port of the second device is connected to one side of the Ethernet ring, and a second port of the second device is connected to the other side of the Ethernet ring. The second device sends the first packet to the first device through the first port, and sends the first packet to the first device through the second port. Because a port of a device in the Ethernet ring is blocked, in the two first packets sent by the second device from the two ports, only one first packet can be successfully transmitted to the first device.

The first packet sent by the second device includes a device identifier of a source device and a device identifier of a destination device.

For another device between the second device and the first device, the other device receives the first packet from one port, determines, based on the device identifier of the destination device included in the first packet, that the first packet is not a packet sent to the other device, and sends the first packet through the other port.

For example, refer to FIG. 2. A connection is established in a third-party network between a first port P21 of the device 2 and a first port P11 of a device 1. The device 2 sends the first packet to the third-party network through the first port P11, and the first packet is transmitted to the first port P11 of the device 1 through the connection. A connection is established between a second port P22 of the device 2 and a first port P31 of a device 3. The device 2 further sends the first packet to the device 3 through the second port P21. The device identifier of the source device included in the first packet sent by the device 2 is a device identifier of the device 2, and the device identifier of the destination device included in the first packet sent by the device 2 is a device identifier of the device 4.

The device 1 receives the first packet through the first port P11, determines, based on the device identifier of the destination device included in the first packet, that the first packet is not a packet sent to the device 1, and sends the first packet to the device 4 through the second port P12. Similarly, the device 3 receives the first packet through the first port P31, and determines, based on the device identifier of the destination device included in the first packet, that the first packet is not a packet sent to the device 3. Because a second port P32 of the device 3 is blocked, the device 3 stops sending the first packet.

Step 303: The first device receives the first packet, and obtains second authentication information of the Ethernet ring based on the identifier information of the Ethernet ring included in the first packet.

In this step, the first device receives the first packet; obtains the identifier information of the Ethernet ring from the first packet; obtains the ring configuration information of the Ethernet ring from the correspondence between identifier information and ring configuration information based on the identifier information of the Ethernet ring; and encrypts the ring configuration information by using the encryption algorithm to obtain the second authentication information of the Ethernet ring.

Optionally, the first device may select at least one configuration parameter from the ring configuration information to form the digest information, and encrypt the digest information by using the encryption algorithm to obtain the second authentication information of the Ethernet ring.

Optionally, the devices in the Ethernet ring may agree in advance to select, from the ring configuration information of the Ethernet ring, the configuration parameter that constitutes the digest information. Therefore, in this step, the configuration parameter selected by the first device from the ring configuration information of the Ethernet ring is the same as the configuration parameter selected by the second device from the ring configuration information of the Ethernet ring. In this way, it is ensured that the digest information formed by the first device is the same as the digest information formed by the second device. It is also ensured that the second authentication information obtained through encrypting, by the first device, the digest information formed by the first device is the same as the first authentication information obtained through encrypting, by the second device, the digest information formed by the second device.

The implementation in which the first device forms the digest information is the same as the implementation in which the second device forms the digest information. Details are not described herein again.

Step 304: The first device verifies the validity of the first packet based on the first authentication information included in the first packet and the second authentication information of the Ethernet ring.

The first device may obtain the first authentication information from the first packet, and compare the first authentication information with the second authentication information. If the first authentication information and the second authentication information are the same, the first device verifies that the first packet is valid. If the first authentication information and the second authentication information are different, the first device verifies that the first packet is invalid.

When the first device verifies that the first packet is invalid, the first device directly discards the first packet. When the first device verifies that the first packet is valid, the first device performs the following operation in Step 305.

Optionally, refer to FIG. 5. The first packet includes the end TLV field. The first device reads content included in the Type field that is in the end TLV field. If the read content is the authentication indication, the first device determines, based on the authentication indication, that the content included in the Value field that is in the end TLV field is the first authentication information, and reads the first authentication information from the Value field.

Step 305: The first device processes the first packet when the first device verifies that the first packet is valid, or discards the first packet when the first device verifies that the first packet is invalid.

The first device removes the first authentication information from the first packet to obtain a second packet, and a processor of the first device processes the second packet.

For example, it is assumed that the device 4 verifies that the first packet is valid. The device 4 removes the first authentication information from the first packet to obtain the second packet, and a processor of the device 4 processes the second packet.

Optionally, the first device may also receive a packet sent by a device outside the Ethernet ring. The packet may be a packet forged by the device outside the Ethernet ring. Because the device cannot obtain real authentication information of the Ethernet ring, when the first device verifies the packet based on the identifier information and the authentication information of the Ethernet ring in the packet, the first device absolutely determines that the packet is invalid, and discards the packet. This prevents the packet from attacking the Ethernet ring.

Optionally, when the identifier information corresponding to the Ethernet ring is the network identifier of the VLAN corresponding to the Ethernet ring, if a technician configures the VLAN corresponding to the Ethernet ring as a VLAN of another Ethernet ring in the second device, ring configuration information obtained by the first device based on the network identifier of the VLAN is ring configuration information of the other Ethernet ring, and second authentication information of the other Ethernet ring is obtained based on the ring configuration information of the other Ethernet ring. In this case, the second authentication information is different from the first authentication information in the first packet. The first device verifies that the first packet is invalid, and discards the first packet. In this way, broadcasting of the first packet cannot continue in the Ethernet ring, and a broadcast storm is avoided.

In some embodiments of this application, when the second device needs to send the packet to the first device in the Ethernet ring, the second device generates the first packet including the first authentication information of the Ethernet ring, and sends the first packet to the first device in the Ethernet ring. The first device receives the first packet, and obtains the second authentication information of the Ethernet ring based on the identifier information of the Ethernet ring included in the first packet. The first device verifies the validity of the first packet based on the second authentication information of the Ethernet ring and the first authentication information included in the first packet. When the first device verifies that the first packet is valid, the first device processes the first packet. This can effectively prevent a hacker from attacking the Ethernet ring through the third-party network and improve the security of the Ethernet ring.

Figure 7:
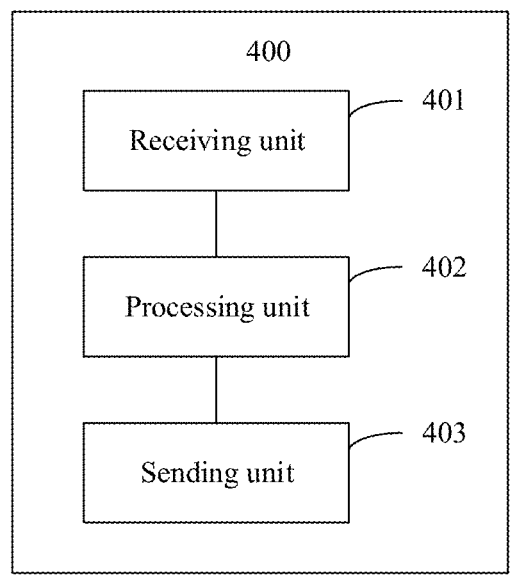
FIG. 7 is a schematic diagram of a structure of a packet processing apparatus according to an embodiment of this application.

Refer to FIG. 7. An embodiment of this application provides a packet processing apparatus 400. The apparatus 400 is an edge device of an Ethernet ring. The apparatus 400 may be deployed on the first device in any one of the foregoing embodiments, for example, may be deployed on the first device in the embodiment shown in FIG. 3 or FIG. 6. The apparatus 400 includes a receiving unit 401 and a processing unit 402.

A second device may generate a first packet including identifier information and first authentication information of the Ethernet ring. The second device is a device outside the Ethernet ring, and sends the first packet to a device in the Ethernet ring.

Because the apparatus 400 is the edge device of the Ethernet ring, the receiving unit 401 of the apparatus 400 receives the first packet.

Then the processing unit 402 verifies the validity of the first packet based on the identifier information and the first authentication information, and processes the first packet after verifying that the first packet is valid.

Optionally, for a detailed implementation process in which the processing unit 402 verifies the validity of the first packet, refer to related content in Step 204 in the embodiment shown in FIG. 3 or Step 304 in the embodiment shown in FIG. 6.

Optionally, the process in which the processing unit 402 verifies the first packet may be: obtaining, based on the identifier information, real authentication information corresponding to the Ethernet ring; using the obtained authentication information as second authentication information; and verifying the validity of the first packet based on the first authentication information and the second authentication information.

Optionally, for a detailed implementation process in which the processing unit 402 obtains the second authentication information, refer to related content in Step 203 in the embodiment shown in FIG. 3 or Step 303 in the embodiment shown in FIG. 6.

For a detailed implementation process in which the processing unit 402 verifies the validity of the first packet based on the first authentication information and the second authentication information, refer to related content in Step 204 in the embodiment shown in FIG. 3 or Step 304 in the embodiment shown in FIG. 6.

Optionally, a process in which the processing unit 402 obtains the second authentication information may be: obtaining ring configuration information of the Ethernet ring from a correspondence between identifier information and ring configuration information based on the identifier information; and encrypting some or all configuration parameters included in the ring configuration information, to obtain the real authentication information corresponding to the Ethernet ring, that is, to obtain the second authentication information.

Optionally, for a detailed implementation process in which the processing unit 402 encrypts the ring configuration information, refer to related content of encrypting the ring configuration information by the second device in Step 201 in the embodiment shown in FIG. 3 or Step 301 in the embodiment shown in FIG. 6.

Optionally, the apparatus 400 further includes a sending unit 403. When a destination device corresponding to the first packet is a third device on the Ethernet, the processing unit 402 removes the first authentication information from the first packet, to obtain a second packet.

The sending unit 403 sends the second packet to the third device on the Ethernet.

Optionally, when the apparatus 400 needs to send a packet to a fourth device on the Ethernet, the processing unit 402 obtains a third packet, where the third packet includes identifier information of the Ethernet ring and the second authentication information of the Ethernet ring.

The sending unit 403 sends the third packet to the fourth device on the Ethernet.

Optionally, for a detailed implementation process in which the processing unit 402 obtains the third packet, refer to related content of obtaining the first packet by the second device in Step 201 in the embodiment shown in FIG. 3 or Step 301 in the embodiment shown in FIG. 6.

Optionally, the receiving unit 401 receives a fourth packet from a fifth device in the Ethernet ring, where the fourth packet includes the identifier information of the Ethernet ring.

The processing unit 402 obtains the second authentication information of the Ethernet ring based on the identifier information; and adds the second authentication information to the fourth packet to obtain the third packet.

Optionally, for the detailed implementation process in which the processing unit 402 obtains the second authentication information of the Ethernet ring, refer to related content of obtaining the first authentication information by the second device in Step 201 in the embodiment shown in FIG. 3 or Step 301 in the embodiment shown in FIG. 6.

Optionally, the ring configuration information of the Ethernet ring includes at least one of the following: key information, a ring identifier of the Ethernet ring, a network identifier of a virtual local area network VLAN corresponding to the Ethernet ring, a device identifier of a device included in the Ethernet ring, a maintenance association end point MEP value of the Ethernet ring, and protocol version information corresponding to the Ethernet ring.

In some embodiments of this application, the receiving unit receives the first packet sent by the second device, where the first packet includes the identifier information and the first authentication information of the Ethernet ring. Then the processing unit verifies the validity of the first packet based on the identifier information and the first authentication information, and processes the first packet after verifying that the first packet is valid. Because the first packet includes the identifier information and the first authentication information of the Ethernet ring, the processing unit verifies the validity of the first packet based on the identifier information and the first authentication information, to effectively verify a forged packet used to attack the Ethernet ring. The processing unit processes the first packet after verifying that the packet is valid. This improves the security of the Ethernet ring.

Figure 8:
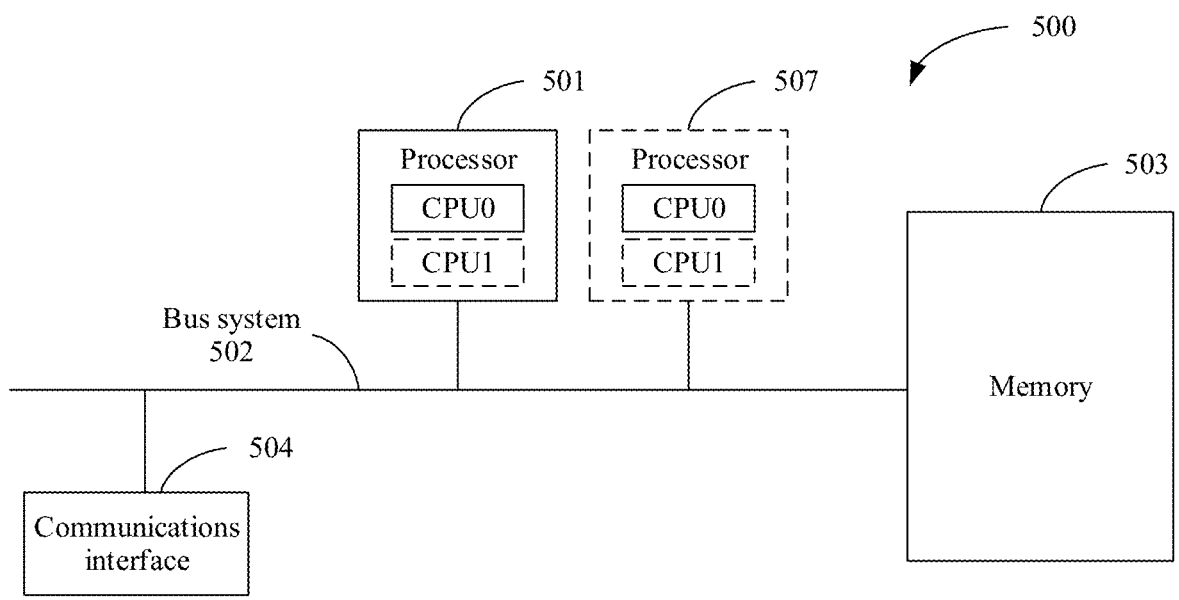
FIG. 8 is a schematic diagram of a structure of another packet processing apparatus according to an embodiment of this application.

FIG. 8 is a schematic diagram of a packet processing apparatus 500 according to an embodiment of this application. The apparatus 500 may be the first device in any one of the foregoing embodiments, for example, may be the first device in the embodiment shown in FIG. 3 or FIG. 6. The apparatus 500 includes at least one processor 501, a bus system 502, a memory 503, and at least one communications interface 504.

The apparatus 500 is an apparatus of a hardware structure, and may be configured to implement functional modules in the apparatus 400 shown in FIG. 7. For example, a person skilled in the art may figure out that the processing unit 402 in the apparatus 400 shown in FIG. 7 may be implemented by the at least one processor 501 by invoking code in the memory 503, and the receiving unit 401 and the sending unit 403 in the apparatus 400 shown in FIG. 7 may be implemented by the communications interface 504.

Optionally, the processor 501 is configured to perform the operation performed by the second device in Step 201 and the operations performed by the first device in Step 203 to Step 205 in the embodiment shown in FIG. 3; or perform the operation performed by the second device in Step 301 and the operations performed by the first device in Step 303 to Step 305 in the embodiment shown in FIG. 6.

Optionally, the apparatus 500 may further be configured to implement a function of the collection analysis device in any one of the foregoing embodiments.

Optionally, the processor 501 may be a general-purpose central processing unit (CPU), a network processor (NP), a microprocessor, an application-specific integrated circuit (ASIC), or one or more integrated circuits configured to control program execution of the solutions of this application.

The bus system 502 may include a path for transmitting information between the foregoing components.

The communications interface 504 is configured to communicate with another device or a communications network.

The memory 503 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through a bus. Alternatively, the memory may be integrated with the processor.

The memory 503 is configured to store application program code for performing the solutions of this application, and the processor 501 controls the execution. The processor 501 is configured to execute the application program code stored in the memory 503, to implement functions in the method in this patent.

In some embodiments, the processor 501 may include one or more CPUs, for example, a CPU 0 and a CPU 1 in FIG. 8.

In some embodiments, the apparatus 500 may include a plurality of processors, for example, the processor 501 and a processor 507 shown in FIG. 8. Each of these processors may be a single-core (single-CPU) processor or a multi-core (multi-CPU) processor. Herein, the processor may be one or more devices, circuits, and/or processing cores configured to process data (for example, computer program instructions).

Figure 9:
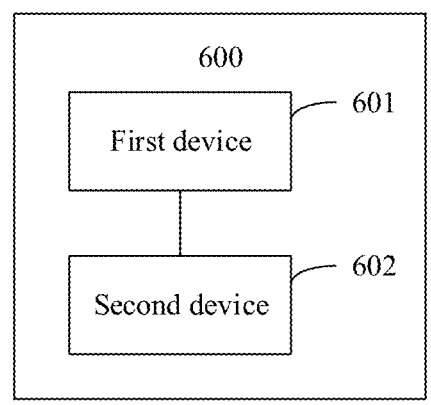
FIG. 9 is a schematic diagram of a structure of a packet processing system according to an embodiment of this application.

In referring to FIG. 9, an embodiment of this application provides a packet processing system 600. The system 600 includes:

a first device 601 and a second device 602, where the first device 601 is an edge device of an Ethernet ring, and the second device 602 is a device outside the Ethernet ring.

The second device 602 is configured to send a first packet to the first device 601, where the first packet includes identifier information and first authentication information of the Ethernet ring.

The first device 601 is configured to receive the first packet, verify the validity of the first packet based on the identifier information and the first authentication information, and process the first packet after verifying that the first packet is valid.

In some embodiments of this application, the first device receives the first packet sent by the second device, where the first packet includes the identifier information and the first authentication information of the Ethernet ring. The first device verifies the validity of the first packet based on the identifier information and the first authentication information, and processes the first packet after verifying that the first packet is valid. Because the first packet includes the identifier information and the first authentication information of the Ethernet ring, the first device verifies the validity of the first packet based on the identifier information and the first authentication information, to effectively verify a forged packet used to attack the Ethernet ring. The first device processes the first packet after verifying that the packet is valid. This improves the security of the Ethernet ring.

A person of ordinary skill in the art may understand that all or some of the steps in the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the principle of this application should fall within the protection scope of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet processing method, comprising:
   receiving, by a first device, a first packet sent by a second device, wherein the first packet comprises identifier information and first authentication information of an Ethernet ring, the first device is an edge device of the Ethernet ring, and the second device is a device outside the Ethernet ring, wherein the first packet includes a type length value field which includes a type field, a length filed and a value field, and the type field includes an authentication indication, the length field includes a length of the value field, and the value field includes the first authentication information;
   verifying, by the first device, validity of the first packet based on the identifier information and the first authentication information; and
   processing, by the first device, the first packet after verifying that the first packet is valid.

2. The method according to claim 1, wherein the verifying, by the first device, validity of the first packet based on the identifier information and the first authentication information comprises:
   obtaining, by the first device, second authentication information of the Ethernet ring based on the identifier information; and
   verifying, by the first device, the validity of the first packet based on the first authentication information and the second authentication information.

3. The method according to claim 2, the obtaining, by the first device, second authentication information of the Ethernet ring based on the identifier information of the Ethernet ring comprises:
   obtaining, by the first device, ring configuration information of the Ethernet ring from a correspondence between identifier information and ring configuration information based on the identifier information; and
   encrypting, by the first device, the ring configuration information to obtain the second authentication information of the Ethernet ring.

4. The method according to claim 1, wherein the processing, by the first device, the first packet comprises:
   removing, by the first device, the first authentication information from the first packet to obtain a second packet; and
   sending, by the first device, the second packet to a third device in the Ethernet ring.

5. The method according to claim 1, wherein the method further comprises:

obtaining, by the first device, a third packet, wherein the third packet comprises the identifier information of the Ethernet ring and second authentication information of the Ethernet ring; and
sending, by the first device, the third packet to a fourth device in the Ethernet ring.

6. The method according to claim 5, wherein the obtaining, by the first device, a third packet comprises:
receiving, by the first device, a fourth packet from a fifth device in the Ethernet ring, wherein the fourth packet comprises the identifier information of the Ethernet ring;
obtaining, by the first device, the second authentication information of the Ethernet ring based on the identifier information; and
adding, by the first device, the second authentication information in the fourth packet to obtain the third packet.

7. The method according to claim 3, wherein the ring configuration information of the Ethernet ring comprises at least one of the following: key information, a ring identifier of the Ethernet ring, a network identifier of a virtual local area network corresponding to the Ethernet ring, a device identifier of a device comprised in the Ethernet ring, a maintenance association end point value of the Ethernet ring, and protocol version information corresponding to the Ethernet ring.

8. The method according to claim 1, wherein the authentication indication is used to indicate that content included in the value field is the first authentication information.

9. A packet processing apparatus, wherein the apparatus comprises:
a memory storing instructions; and
a processor coupled to the memory to execute the instructions to:
receive a first packet sent by a second device, wherein the first packet comprises identifier information and first authentication information of an Ethernet ring, the packet processing apparatus is an edge device of the Ethernet ring, and the second device is a device outside the Ethernet ring, wherein the first packet includes a type length value field which includes a type field, a length filed and a value field, and the type field includes an authentication indication, the length field includes a length of the value field, and the value field includes the first authentication information;
verify validity of the first packet based on the identifier information and the first authentication information; and
process the first packet after verifying that the first packet is valid.

10. The apparatus according to claim 9, wherein the processor is coupled to the memory to further execute the instructions to:
obtain second authentication information of the Ethernet ring based on the identifier information; and
verify the validity of the first packet based on the first authentication information and the second authentication information.

11. The apparatus according to claim 10, wherein the processor is coupled to the memory to further execute the instructions to:
obtain ring configuration information of the Ethernet ring from a correspondence between identifier information and ring configuration information based on the identifier information; and encrypt the ring configuration information to obtain the second authentication information of the Ethernet ring.

12. The apparatus according to claim 9, wherein the processor is coupled to the memory to further execute the instructions to:
remove the first authentication information from the first packet to obtain a second packet; and
send the second packet to a third device in the Ethernet ring.

13. The apparatus according to claim 9, wherein the processor is coupled to the memory to further execute the instructions to:
obtain a third packet, wherein the third packet comprises the identifier information of the Ethernet ring and second authentication information of the Ethernet ring; and
send the third packet to a fourth device in the Ethernet ring.

14. The apparatus according to claim 13, wherein the processor is coupled to the memory to execute the instructions to:
receive a fourth packet from a fifth device in the Ethernet ring, wherein the fourth packet comprises the identifier information of the Ethernet ring; and
obtain the second authentication information of the Ethernet ring based on the identifier information, and add the second authentication information to the fourth packet to obtain the third packet.

15. The apparatus according to claim 11, wherein the ring configuration information of the Ethernet ring comprises at least one of the following: key information, a ring identifier of the Ethernet ring, a network identifier of a virtual local area network corresponding to the Ethernet ring, a device identifier of a device comprised in the Ethernet ring, a maintenance association end point value of the Ethernet ring, and protocol version information corresponding to the Ethernet ring.

16. The apparatus according to claim 9, wherein the authentication indication is used to indicate that content included in the value field is the first authentication information.

17. A packet processing system, comprising a first device and a second device, wherein the first device is an edge device in an Ethernet ring, the second device is a device outside the Ethernet ring,
the second device is configured to send a first packet to the first device, and the first packet comprises identifier information and first authentication information of the Ethernet ring, wherein the first packet includes a type length value field which includes a type field, a length filed and a value field, and the type field includes an authentication indication, the length field includes a length of the value field, and the value field includes the first authentication information; and
the first device is configured to receive the first packet, and verify validity of the first packet based on the identifier information and the first authentication information, and process the first packet after verifying that the first packet is valid.

18. The packet processing system of claim 17, wherein the first device is further configured to:
obtain ring configuration information of the Ethernet ring from a correspondence between identifier information and ring configuration information based on the identifier information;

encrypt the ring configuration information to obtain second authentication information of the Ethernet ring; and verify the validity of the first packet based on the first authentication information and the second authentication information.

19. The packet processing system of claim 18, wherein the first device is further configured to:

obtain a third packet, wherein the third packet comprises the identifier information of the Ethernet ring and the second authentication information of the Ethernet ring; and send the third packet to a fourth device in the Ethernet ring.

20. The packet processing system of claim 17, wherein the authentication indication is used to indicate that content included in the value field is the first authentication information.

* * * * *